United States Patent [19]

McRae et al.

[11] Patent Number: 4,847,766
[45] Date of Patent: Jul. 11, 1989

[54] DICTIONARY TYPEWRITER WITH CORRECTION OF COMMONLY CONFUSED WORDS

[75] Inventors: Doris J. McRae, Danbury, Conn.; Richard E. Roberts, Cortland, N.Y.

[73] Assignee: Smith Corona Corporation, Cortland, N.Y.

[21] Appl. No.: 141,031

[22] Filed: Jan. 5, 1988

[51] Int. Cl.[4] .................. G06F 15/21; G06F 7/04; B41J 5/30
[52] U.S. Cl. .................... 364/419; 364/900; 364/943.5; 400/63
[58] Field of Search ........... 364/900, 419; 400/63, 400/697.1

[56] References Cited

U.S. PATENT DOCUMENTS 4,783,761 11/1988 Gray et al. ................... 364/900

Primary Examiner—Clark A. Jablon

[57] ABSTRACT

A word-processing system or memory typewriter having a list of commonly-confused words together with a definition for each word in the list and associated alternative words and their definitions, all stored in the memory. An audiovisual warning signal is generated upon each entry of a commonly-confused word so that the typist can press key controls to display definitions of the entered word and its alternatives. The list is of general applicability but, where specific ones of the commonly-confused words cause no concern to a particular typist, the controls may be individually modified by that typist to suppress issuance of the warning signal when these specific words are entered thereafter. Preferably, a Dictionary List of properly-spelled words is present in the system and utilized in controlling access to the list of commonly-confused words. When the definition of an alternative word more nearly matches the one desired, the typist's pressing of the usual carrier return key on the typewriter keyboard causes the system to display and/or print the alternative in place of the misused original word (in proper alignment, of course).

12 Claims, 4 Drawing Sheets

DICTIONARY TYPEWRITER WITH CORRECTION OF COMMONLY CONFUSED WORDS

CROSS REFERENCE TO RELATED APPLICATIONS

The present invention is an improvement on the "dictionary" typewriter disclosed in:

(I) Application No. 813,351 entitled "Spelling-Check Dictionary with Early Error Signal", filed Dec. 26, 1985 by R. W. Gray et al, and issued Nov. 8, 1988 as U.S. Pat. No. 4,783,761.

(II) Application No. 869,777 entitled "Dictionary Memory with Visual Scanning from Selectable Starting Point" and filed June 2, 1986 by Howard C. Duncan IV et al, and issued Feb. 21, 1989 as U.S. Pat. No. 4,807,181.

(III) Application No. 000,700 filed by Howard C. Duncan IV et al on Jan. 6, 1987 and titled "Adaptive Spelling Corrector", and issued Jan. 10, 1989 as U.S. Pat. No. 4,797,855.

(IV) Application No. 000,698 filed by Howard C. Duncan IV on Jan. 6, 1987 and entitled "Auto Realigned Print Correciton" and lastly, (V) U.S. Pat. No. 4,655,620 issued to Donald T. Adams et al on Apr. 7, 1987 and entitled "Spelling Error Finding Feature Including an Electronic Spelling Dictionary".

Note that all five applications/patent are assigned to the present assignee and that for convenience and brevity they will be referred to by the above-shown Roman numerals when cited in the specification. Material therein relevant to the present invention is hereby incorporated by reference.

1. Field of the Invention

The invention relates to word processors (or "memory" typewriters as they are sometimes called), which normally incorporate the capability of correcting any erroneous words in a last-entered group of words, such as a line, paragraph, etc. More particularly, it relates to those storing lists of words to which reference can be made for various purposes (e.g. spelling dictionary, thesaurus, etc.).

2. Background

Correcting typewriters have long been known (e.g. U.S. Pat. No. 3,780,846 entitled "Automatic Erasing Typewriter" and filed by Robert A. Kolpek et al, which issued Oct. 9, 1973) which can remove incorrect characters and allow entry of correct ones by following an appropriate sequence of keystrokes.

Subsequently, "Dictionary" typewriters have appeared on the market which contain a listing of over 50,000, say, correctly-spelled words stored in a read-only section of an electronic memory (e.g. the Smith-Corona XD7000 based on structure substantially as disclosed in Reference I). An error detection unit monitors successive text entries and emits a visual or auditory signal when comparison of an entered word with the words stored in the "dictionary" shows disagreement with spelling of the entered word. In more powerful versions of the typewriter having an associated display unit, after an incorrect word has been entered the typist may then cause (Ref. II) a search of the stored words based on initial, probably correct letters of the entered word, to find and display—in alphabetical order—successive, properly-spelled "trial" words (in a "List Mode" as it has been termed) sharing those initial letters of the incorrect word, one of these trial words then being selectable to replace the incorrect word. The "trial" word may also be selected statistically according to types of spelling errors most frequently committed by the typist (Ref. III).

Since that time, the market has likewise seen the advent of electronic typewriters with memories storing thesauri from which a typist can select one of a succession of synonyms and retrieve it for replacement of an over-used word.

While the foregoing improvements had done much to enhance the quality of communications prepared by poor spellers, dull writers, etc., there still remained the problem of words used incorrectly but not discriminated by the above-described systems because they are properly spelled (e.g. homonyms: boar and bore, vulgarisms: "learn" for "teach", etc.). Yet, in the past such words required time-consuming, knowledgeable proofreading for detection and slow, manual keyboard operations for correction of text.

In recent years, Houghton-Mifflin of Boston, Mass. collected a list of commonly-confused words numbering some 1600 in total and licenses this list together with software for gaining access to each word when stored in memory. That software has a deficiency, however, in that on entry of such a word, it only returns a string of characters containing the word, its definition, and at least one word with which it is confused, together with the definition of that word. Subsequent handling of the string for display and selection is not provided nor is there any way of avoiding retrieval of the definition of the word and its alternatives as a typist learns the difference between some of the words and no longer needs to be reminded there. In that case, automatic calling of attention to entry of the more frequently encountered ones of these words proves to be more of a distraction than a help.

More recently, IBM U.S. Pat. No. 4,674,065 disclosed a system for detecting "homophones and confusable words" present in a list stored in memory along with related sets of syntactic rules. Each word in the list is identified with specific sets applicable in determining proper usage. By applying appropriate rules on entry of a listed word, propriety of usage may be ascertained and if improper, alternative words and their definitions presented for a decision by the operator. At that point, the operator may select an alternative word to replace the misused word by positioning the display cursor under the desired alternative and depressing an appropriate key on the keyboard. The approach is powerful and significantly reduces "noise"—i.e., repetitious presentation of commonly confused words, definitions and alternatives is reduced where they are not a problem to a given operator. This advantage is achieved, however, at the expense of considerable addition of memory capacity devoted to the rules and identification of their applicability in each instance.

Thus, there is need for a simple, low-cost yet efficient system discerning presence of misused words of the commonly-confused type and providing information as to related alternatives selectable by the typist. The system should be adaptable to electronic typewriters of the consumer type having limited display and memory capacity, and it should permit elimination of unwanted signaling of words. Furthermore, selection of replacement of a misused word by an alternative should preferably be performed in a simple fashion.

SUMMARY OF THE INVENTION

A word-processing system having a memory, character and control input to the system through a keyboard with a plurality of alphanumeric and function keys depressible by an operator, and a display; in combination with a list of commonly-confused words stored within the memory along with a definition for each word in the list and at least one alternative word and the definition thereof associated with the listed word; a detection element for sensing entry of any word on the list, a normally enabled generator of a warning signal for the operator activated in response to sensing entry of any listed word by the detection element; a first control responsive to pressing a discrete one of the depressible keys, the first control being operable to present in the display the entered word along with the definition thereof; and a second control interposed between the detection element and the warning signal generator, the second control being actuatable by the operator for selectively disabling responsiveness of the generator to entry of any word on the list.

According to a further feature of the invention, the second control is associated with a modified dictionary list of properly-spelled words incorporated in the system, and access to the list of commonly-confused words is controlled—in turn—by information in the dictionary list.

Accordingly, it is an object of the invention to provide an improved memory typewriter or word processing system having fast, efficient and selective detection and proper replacement of potentially misused words in text presented on a display and/or a printed document.

It is a further object of the invention to provide controls for ceasing to call attention to any word of a group of commonly-confused words when the typist is no longer prone to inadvertent confusion of that word with the actually desired word of the group. This affords the typist the opportunity for selectivity in viewing each group of words and respective definitions.

Moreover, it is yet another object of the invention to allow a less knowledgeable typist to revoke a previous typist's selective alteration of the above-mentioned controls so that the less knowledgeable typist can receive the benefit of response to entry of words in the complete list.

Furthermore, it is still another object of the invention that when misused word is located within a string of valid words, and an alternative word selected from the list of commonly-confused words is of different length than the misused word, then upon operator acceptance of a displayed definition as being that of the word actually desired—an acceptance indicated by depression of a print control key, automatic erasure of erroneous characters and improperly located characters on the document occurs followed by printing of appropriate characters of the alternative word and any relocated characters in proper alignment on the document.

Other objects and features of the invention will become evident from a reading of the ensuing description taken in conjunction with the drawing.

BRIEF DESCRIPTION OF THE DRAWING

FIG. 1 is essentially similar to the identically numbered figure in the above-cited U.S. Pat. No. 4,655,620 (termed Reference V hereinafter). Note that reference numerals are generally the same for like elements in the main figures of all cited applications, but where elements are specific to the present invention, reference numerals are three digits long and begin with the number 800.

DESCRIPTION OF THE PREFERRED EMBODIMENT

The invention may be applied to what may be broadly termed an interactive word information processing system 10 either of the type having separate, cable-connected modules or in the form of a single unit such as a "memory" typewriter 10 (or electronic correcting typewriter as it is also termed). For simplicity, the latter form will be assumed for the present description. In either case, according to the block diagram of FIG. 1, System 10 has four principal units: a Keyboard 12, a Printer 14, a Display 16, and an Electronic Control Circuit 11 (encircled by dashed lines), in which—according to the invention—a Word-Alert Feature 800 (an adjunct bounded by dot-dash lines at left in FIG. 1) is incorporated. As seen, Word-Alert (TM) Feature 800 comprises a Word-Alert Control 802 and a Word-Alert List 804, this last containing the 1606 commonly-confused words of Houghton Mifflin and a brief definition of each, as will be described shortly. Word-Alert Control 802 is primarily concerned with alerting of the typist when one of the words in List 804 is entered through Keyboard 12. Further, another memory unit 52 in Typewriter 10 stores a Spelling Dictionary 806 identical to Dictionary 56 disclosed in Reference I except for addition of a special code identifying each word also present in List 804, and addition of certain address codes relevant to Word-Alert (TM) Feature 800, as described in detail subsequently.

Figure 1:
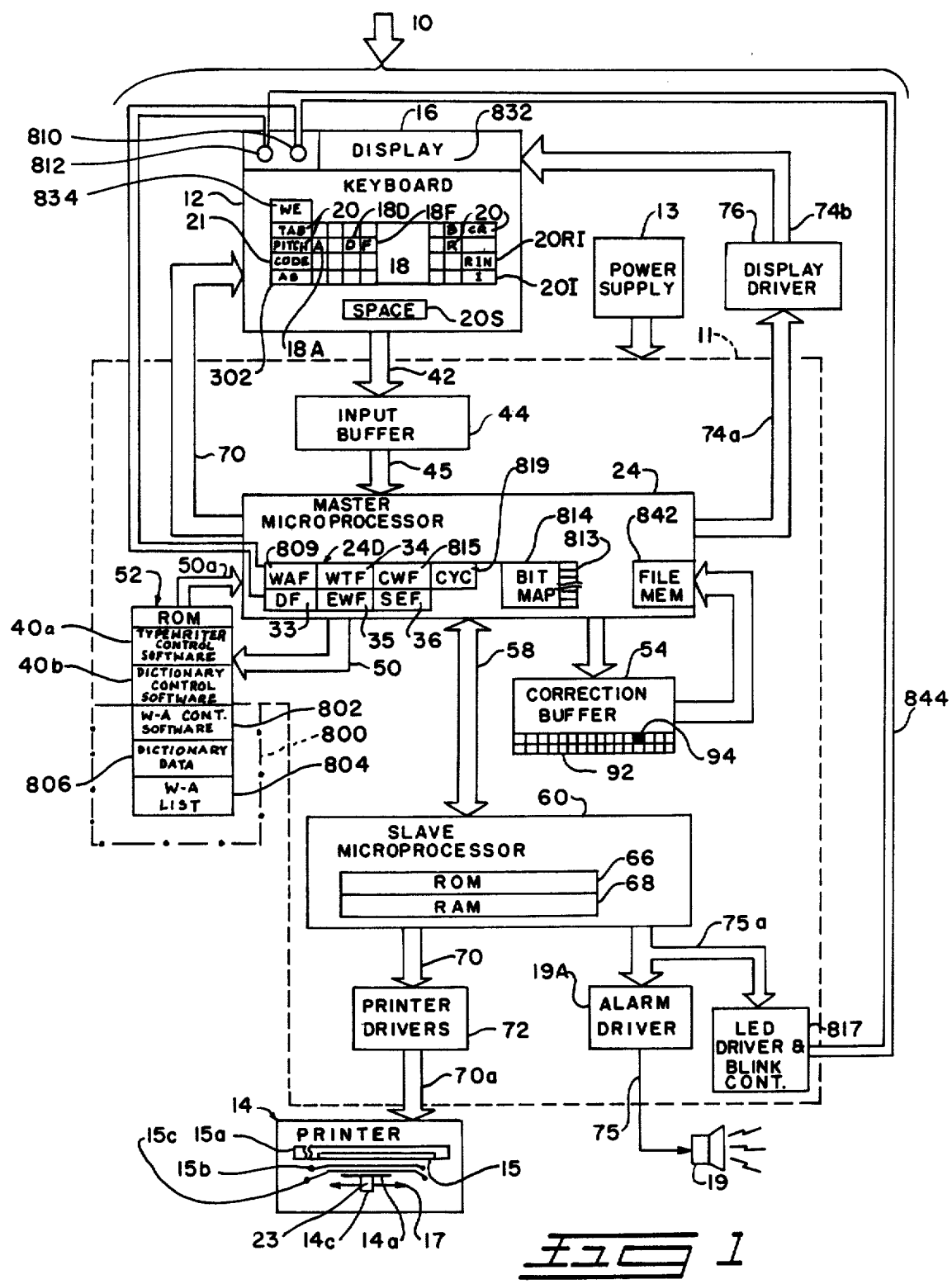
FIG. 1 shows a block diagram of a word-processing system or memory typewriter having a stored dictionary and, according to the invention, a stored list of commonly-confused words and their definitions together with controls included in the stored dictionary for accessing the list to display the words and definitions, and providing automatic replacement of a misused word by a particular alternative upon the typist's selection of a definition matching that of the intended word.

The four principal units 11, 12, 14 and 16 of FIG. 1 interact in the usual fashion, manual selection of any desired typewriter operation being made at Keyboard 12. Printer unit 14 and/or Display 16 are operated under control of Electronic Circuit 11 for accomplishing the function selected by a keyboard input—for example, printing and/or displaying a character corresponding to a character key 18 selected by the typist or corresponding, according to the present invention, to a character supplied by Word-Alert List 804.

Keyboard 12 contains the usual plurality of Character Keys 18, Carrier Control Function Keys 20 (including Return 20R, Backspace 20B, Index 20I, Reverse Index 20RI, Spacebar 20S, etc.), and a "Code" Key 21 (always operated in conjunction with one of the keys 18 or 20) as well asn an Auto-Spell Key 302 (identified as such in Reference III, but having a dual response for purposes of the present invention). Code Key 21 serves to select an operative mode of the system, such as the "Dictionary" mode previously disclosed in Reference I and the "Word-Alert" mode to be described herein.

Upon depressing any one of the various keys on Keyboard 12, a respective keyboard output signal is communicated to Electronic Control Circuit 11, the outputs of which control functions and operations of Typewriter 10. Mainly, these operations relate to the various components of Printer 14—namely, a Platen 15a supporting a Document 15, and a Carrier 14c which holds a rotatable Print Wheel 14a having a plurality of characters formed on it. Print Wheel 14a may be brought into alignment with a Print Hammer 23 for application of characters to Document 15 and subsequent removal of same, if desired, by selective use of an Inked Ribbon 15c or a Correction Ribbon 15b. Print Hammer 23 strikes the aligned character against Document 15 (a sheet of paper or other recording medium) supported on Platen 15a. The striking occurs through the selected one of the Ribbons 15b, 15c in known fashion. Carrier 14c is mounted on Typewriter 10 for left and right horizontal movement along Platen 15a (as indicated by arrowheads 17) upon pressing Backspace Key 20B and Spacebar 20S, respectively, and also for return to the left margin or stop setting (with an accompanying line-feed) when Carrier Return Key 20R is actuated.

The block diagram of FIG. 1 provides an overall view of the Control Circuitry 11 used for implementing the Word-Alert feature 800. A Power Supply 13 is connected to provide the electric power necessary to operate the various electronic components in control circuitry 11. As shown in FIG. 1, system operation is controlled here by communication between Keyboard 12 and a Master Microprocessor 24 (located within Circuit 11 and being a known electronic component such as the 8031 made by Intel Corporation of Santa Clara, Calif). This communication occurs by use of an equally well-known interrupt technique issued periodically (e.g. every 7 milliseconds) on bus lines 26. As a result of the interrupt, Keyboard 12 (more particularly, a matrix arrangement of keyboard switches, which is not shown, but is known) is scanned to detect actuation of any key 18, 20, etc. A logic code signal representative of the key actuated appears on bus line 42 extending to an Input Buffer 44 (a Hex Non-Inverting buffer, such as a CD 4503 made by National Semiconductor Co. of Santa Clara). Keyboard signals are temporarily stored by Input Buffer 44 in order of keyboard entry. Master Microprocessor 24 receives data—in turn—from Input Buffer 44 via bus line 45.

Master Microprocessor 24 typically has various electronic control elements including a known Status RAM 24D which provides temporary storage of presently active information—e.g. a plurality of Flags (known single-bit, two-state memory units) periodically interrogated as part of the system's program routine. The flags relevant to the invention include—among others discussed herein—a Dictionary Flag 33, a "Word-Alert" Flag 809 indicating that scanning entries for "confusable words" has been activated, and a "Confusable Word" Flag 815 which is set upon detection of such a word either after entry through Keyboard 12 or after forward (or backward) scanning of text stored in Correction Buffer 54, as will be described. Other known flags may also be present for purposes of particular activities not relevant to Word-Alert.

Master Microprocessor 24 is associated with external electronics including ROM unit 52 for controlling Master Microprocessor 24. ROM unit 52 contains Typewriter Control Software 40a, Dictionary Control Software 40b, and the Word-Alert feature 800, this last having not only the corresponding Control Software 802 and List 804 of commonly-confused words, but also a special set of Dictionary Data 806, as mentioned earlier. That set 806 comprises the usual character codes forming a list of properly-spelled words used to verify the spelling order of characters upon release of printer decode signals from RAM area 54 described briefly below. According to the invention set 806 also has special codes 807 identifying each word which is a duplicate of one in List 804, each special code 807 being followed by three digits 808 of code addressing locations in a register storing status bits for disabling the Word-Alert signal in reference to specific words of List 804 which are never confused by the particular operator of Type-writer 10, as will be described.

As also seen in FIG. 1, the character and control code signals appear on a bus line 50 connected ot a ROM 52 (Read-Only Memory). ROM 52, in response, sends data and control signals to Master Microprocessor 24 via bus line 50b. In the instance of pressing a printable symbol Key 18, for example, the printer code signals are sent to a RAM 54 for storage, this last serving as a Correction Buffer 54 (as it will be termed hereinafter) and storing a full line of text characters. ROM 52 preferably also includes a tertiary set of program instructions for the automatic statistical correction operation according to Auto-Spell System 300 of Reference III, and a Correction Element Storage 304 (neither shown herein).

Correction Buffer 54 operatively associated with Master Microprocessor 24 comprises a stack of memory bytes 92 (a static RAM having 1024×4 bits and being identified as an IC unit known commercially by the designation "2114") for storing coded information as to characters selected at Keyboard 12 and processed by Microprocessor 24. Correction Buffer 54 is addressable by a Display Cursor 832 (shown as an underline in Display 16) coordinated with a pointer 94 (shown solid in FIG. 1 and termed a "find" pointer hereinafter for reasons becoming evident shortly) located at a byte position corresponding to the current position of Carrier 14c. In this regard, the character previously entered at the current position of Carrier 14c can be recalled from Correction Buffer 54 for purposes of correcting the text. Find Pointer 94 can be moved progressively through the stack of bytes 92 in conjunction with movement of Carrier 14c such that the byte currently indicated has the coded information corresponding to the related character position along Platen 15a. This "find" activity is utilized here (see Reference V, for instance) to locate a commonly confused word just detected by Word-Alert Feature 800 and signaled to the typist, but overrun because of the latter's reaction time.

A character code signal ready for printer processing is sent along the line 58 (output channel) from Master Microprocessor 24 to a further Microprocessor 60 which is slaved to Microprocessor 24 as master. Slave Microprocessor 60 (e.g. the 8051 also made by Intel and identical to the 8031 except for program memory) has its program stored internally in a ROM 66 (4K×8 bits), the code data being stored internally in a RAM 68 (128×8 bits). Code data are read as they are needed by the program in ROM 66 in order to develop, in known fashion, control and drive signals to operate the various elements of Printer 14 (via lines 70, 70a and Printer Drivers 72). Similarly, Display Drivers 76 connected to Master Microprocessor 24 by lines 74 serve to operate Display 16 (via lines 74a) for visually presenting the last plurality of character inputs in known fashion. Display 16 may be operated in conjunction with or independently of Printer 14 and is also used herein for presenting the words and definitions of commonly confused groups of words, as will now be described.

In general, according to the present invention, when Typewirter 10 has been set in the Word-Alert Mode (determined by the SET condition of Flag 809 in Status Register 24D and indicated to the typist by the ON state of LED 810), Control 802 detects entry of any of the commonly-confused words of Word-Alert (TM) List 804. These words are present (see FIG. 3) as separate Groups 820 consisting of a given word 822 and a brief definition thereof, together with each alternative word 826 (and its definition 828) with which the given word 822 is commonly confused. Upon detection of each such entry, System 10 alerts the operator of that entry by issuance of an audible signal from Alarm Device 19, provided reference to that word has not been disabled by the typist (in a manner deribed subsequently) because the entered word 822 is not now confusable to this particular typist. Because Device 19 is also used under other circumstances, intermittent control of a visual signal from an LED ("light emitting diode") 810—associated with Display 16 and normally ON when the Word-Alert (TM) Feature is active—is utilized to distinguish over these other circumstances, as will be explained. Then, upon pressing a particular key of Keyboard 12—either a dedicated key such as A-S Key 302 or a combination of keys, as known—Control 802 clears Display 16 and presents the entered word 822 (see FIG. 3) and its definition 824 instead of the original text. If definition 824 is not that of the desired word, then the typist may press Index Key 20I and each time this is done, an alternative word 826, 826A, etc. of the group 820 of commonly-confused words and the appropriate definition 828, 828A etc. replaces that currently displayed (Spacebar 20S being utilized to bring all of a definition into the display area if display capacity is exceeded). If no further alternatives 826 are available, pressing Reverse Index Key 20RI causes the previously displayed alternative 826A say, or 826 (or original word 822, if the first alternative 826 has already been passed) to be presented again.

Once the typist recognizes a definition 828, (or 828A, etc.) as the desired one (or decides to choose a displayed alternative), the typist simply presses the usual Return key 20R and the misused word 822 previously part of the text visible in Display 16 and on Document 15 (ordinarily a paper Sheet 15, as termed hereinafter) is replaced by the alternative (e.g., 826A), which—together with the remaining text—is again presented in Display 16. Preferably, only changed characters of the misused word 822 on Document 15 are erased, intervening good characters not being erased and rewritten, as disclosed in Reference II. Also, replacement is performed properly (see Reference IV), regardless of any disparity in length of the just-mentioned words relative to one another even if the printed text contains one or more characters (or, for that matter, one or more words) subsequent to the misused word 822. This automatic replacement occurs in response to the typist's pressing of the carrier Return Key 20R even if the related word (826, say) is no longer visible in Display 16, only the definition (828) or a part thereof being present at that time—as will be described.

As described in Reference III, pressing A-S Key 302 when in Dictionary Mode (indicated by the ON condition of LED 812) normally initiates automatic correction of an adjacent incorrectly spelled word, which is not the required action in this instance as it will be assumed the entered word is correctly spelled, but belongs to a group 820 of words often confused. If in Dictionary mode and Word-Alert mode (both LED 812 and 810 being in the ON condition), when a word is misspelled or mistyped, the typist is notified of this by the warbling audible signal emitted by Device 19 (as disclosed in Reference I) together with blinking of the light output of LED 812. Then, pressing "A-S" key 302 before typing any character beyond the end of the word (established by the typist's pressing of Spacebar 20S or other punctuation key as also disclosed in Reference I) causes appearance in Display 16 of only a "trial" word—a correctly-spelled or "valid" word—statistically selected from the Correction Element Storage (not shown, but previously mentioned) so as to match a word existing in Dictionary Data 806 in the manner disclosed in Reference III. If the matched word is not that desired by the typist, further automatic modifications may be attempted by pressing of Index Key 20I one or more times, as necessary. As will be noted, the sequence of key operations is quite similar in both modes, thus minimizing possible errors by the typist in implementing the activities.

While the foregoing indicates that the invention is applicable to a System 10 having a Spelling Dictionary 806, it should be noted that it is also applicable in conjunction with a thesaurus or any other data-base providing a series of suitably arranged words exchangeable for a given original word. For ease and clarity of explanation, however, the embodiment will assume presence of a modified Dictionary 806 containing one or more codes relevant to the Word-Alert program for replacing undesired ones of commonly confused words. The term "undesired" word is, however, to be considered hereinafter as including not only incorrect words, but also trite words replaceable by synonyms from a thesaurus.

At this point, it may be remarked that System 10 normally operates in one of three output modes: Typewriter Mode, Line Mode and Memory Mode. In the first of these output modes, System 10 behaves like a normal typewriter, characters being printed on Sheet 15 as they are entered on Keyboard 12. If Word-Alert feature 800 has been activated (Flag 809 thus being Set), three conditions must be met (see FIG. 4) before alerting of the operator as to entry of a commonly-confused word takes effect. First, entry of a word present in List 804 must be detected (code 807 following the last character 811 of that word in Dictionary List 806). Next, the characters subsequent to Code 807 must include a Word Terminator 112 or 114 to indicate a potentially complete word of List 806, a condition indicated by a Set state for EWF Flag 34 after the pre-scan decribed in References I-III. Lastly, the typist's pressing of Spacebar 20S or a punctuation key likewise identifying an end of a word must follow. Then, assuming all words in List 804 to be enabled, pressing of A-S Key 302 causes clearance of Display 16—as mentioned earlier—and presentation of the entered word and its definition instead of a "trial " word as in the case of misspelling a word on entry when in Dictionary Mode. If the definition of the original word indicates misuse of that word to the operator, pressing of Index Key 20I thereafter presents, in turn, successive alternatives (if more than one exists) and their definitions on Display 16.

When a definition corresponding to the word actually desired is seen on Display 16, then—without moving Cursor 832 back to the alternative word—the typist may press Return key 20R to cause Printer 14 to replace the original misused word on Sheet 15 automatically with the alternative word corresponding to the definition in Display 16. The alternative word will also replace the misused one in Correction Buffer 54.

In Memory Mode or Line Mode, A-S Key 302 and Index Key 20I function in the same manner as in Typewriter Mode except for printing since corresponding text does not appear on Sheet 15 during these two modes until Return Key 20R or the equivalent has been pressed after the Control Program in Word-Alert (802) has ended. In Memory Mode the code for each Key 18 pressed is entered into a portion of RAM in Microprocessor 24 termed "Memory" (842 in FIG. 1) which consists of 8 or 9 pre-addressed, variable length files selectable at Keyboard 12 and providing 16,000 bytes of storage space. Read out to Printer 14 occurs in response to selection of a PRINT option on Display 16 in known fashion and pressing of Return Key 20R. On the other hand, if Flag 815 is Set when Key 20R is pressed, the original word 822 is merely deleted from Memory 842 in known fashion and Alternative Word 826 automatically inserted in its place in Display 16 of FIG. 1 in fashion well-known in the art (e.g., right-shifting of all subsequent characters with wrap-around, as each character of word 826 is entered at that point in the text).

In Line Mode only about 80 characters or so are storable, read out to Printer 14 occurring upon pressing Key 20R (with clearance of memory in preparation for entering characters of the next line) except if Flag 815 is Set, as described above.

Turning now to a detailed description of the invention, it is assumed, initially, that the typist wishes to be alerted as to entry of any word present in the List 804 of commonly confused words (termed "confusable" words hereinafter for simplicity). Accordingly, the Word-Alert feature 800 must first be activated by pressing Code Key 21 and holding it down momentarily while the "A" key 18A is pressed to develop a code signal causing (1) the above-mentioned setting of W-A Flag 809 to a ONE, (2) emission of a "beep" by Alarm Device 19 to indicate acceptance of the command, and lastly, (3) turning ON of LED 810 to indicate by a luminous condition the active state of that feature 800.

Inasmuch as Dictionary Data 806 include codes (807, 808) relevant to the present feature, as stated earlier, it will be assumed for description of this embodiment that the "Spell" feature of References I and III has also been activated, as would be the usual case. Note though, that joint activation is not actually necessary, the checking routines in Dictionary Program 40b being accessible to Word-Alert Program 802 in fashion substantially identical to the normal one disclosed in Reference I and simplified somewhat in References II-III, except for being dependent upon the set state of W-A Flag 809. As a result, then, Dictionary Flag 33 has likewise been set to a ONE and LED 812 turned ON to indicate that activation. Accordingly, as each character of a word is entered, a path is traced into the three tables 78, 80 and 82 of FIG. 2, and—when more than three characters are present, either as part of the word or associated with it in accordance with the invention as next described—extending beyond these tables into Tree Structure 84 where the characters are stored in Huffman coding for compactness (as described in Reference I). Normally, the word entered is spelled correctly, so termination of the word by pressing Spacebar 20S or one of the known punctuation keys on Keyboard 12 sets an EWF Flag 35 which confirms the results of a prescan of the next character—namely, setting of a WT Flag 34 (as described in Reference I) if that next character is a word termination or "WT" Code 112 (or a numeral code 114 denoting a nodal point, as well, as described in References II, III). In the present structure, however, Dictionary List 806 includes codes (See FIG. 2) relevant to Word Alert Feature 800. These codes are the Special Code ("SC") 807 which follows immediately after the last character of a word (e.g., the "D" character 811 in Tree Structure 84 of Dictionary List 806) and identifies the word (e.g. "learned", chosen as an example subsequently) as also being present in W-A List 804. Hence, because Word-Alert Feature 800 is active (LED 810 is ON), detection of SC Code 807 by the above-mentioned prescan indicates the typist should be alerted as to the confusable nature of this word unless the typist has not finished entering the word or does not regard the word as being confusable now and objects to an unnecessary distraction. To guard against this latter eventuality, a Bit Map 814 has been added to Status RAM 24D of Master Microprocessor 24.

Map 814 covers a memory area slightly more than 1600 contiguous bits in 201 bytes (one bit for each of the 1606 confusable words in List 804). The purpose of Map 814 is to afford a given typist the opportunity to disable generation of warning signals with respect to words in List 804 which are not a problem to that typist. By checking the state (i.e. a ONE or a ZERO) of the corresponding "Alert" Bit 813 in Map 814, System 10 can ascertain the typist's wishes in that respect, in fashion described shortly. For the moment, it suffices to note that alerting proceeds when Bit 813 is a ONE, but is inhibited when Bit 813 is a ZERO (the choice being an arbitrary one).

Figure 2:
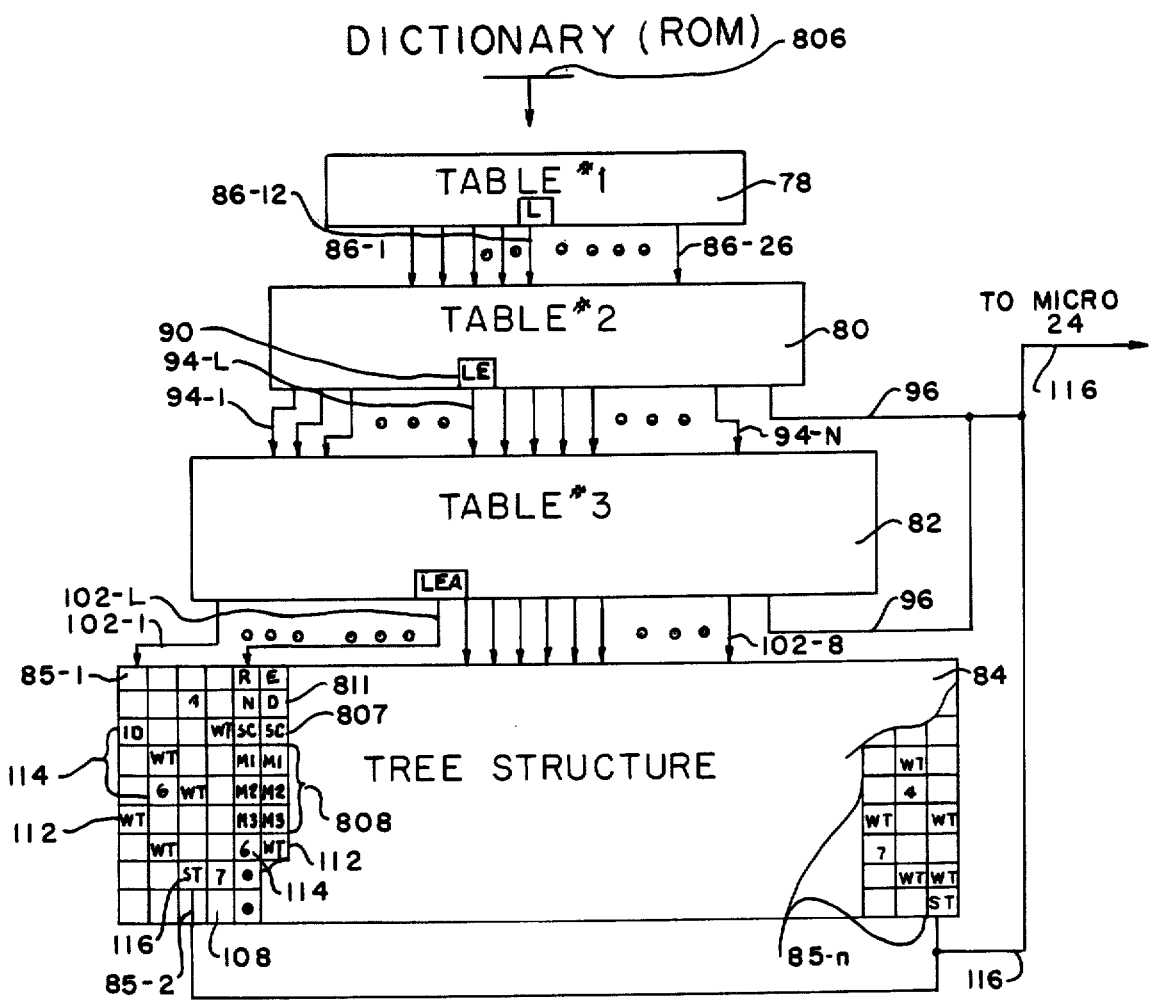
FIG. 2 is a block diagram showing the memory arrangement of the stored dictionary providing the controls of FIG. 1.

As seen in FIG. 2, Special Code 807 is followed by three bytes 808 of address locating the particular bit 813 in Bit Map 814 corresponding to the word entered. The three Bytes 808 (M1-M3) are present in the form of characters which translate into shorter ones of the Huffman codes to save space in Tree Structure 84, but are converted into three hexadecimal digits for indexing purposes. The 9 more-significant bits of hex code identify the byte just before the one containing the desired control Bit 813, whereas the three least significant bits of hex code determine the exact location of Bit 813 within that next byte.

If System 10 is in Word-alert Mode (W-A Flag 809 is a ONE), the state of the selected Bit 813 of Map 814 is then determined in known fashion—as by adding the value stored in that Bit 813 to a ONE in the adder forming part of an ALU (not shown, but well known) in Microprocessor 24 and looking at the usual Carry Output. If that output is a ZERO, say (the choice being arbitrary, as stated above), a warning signal to the typist is suppressed by exit from the program; the check for additional confusable words continuing as further text is entered. All this being done at electronic speeds, there is no apparent delay insofar as concerns the typist. On the other hand, if the state of Bit 813 is a ONE, then the carry output is also a ONE, indicating that a warning signal is to be issued and consequently Alarm Device 19 is energized with a modulated output (warbling signal, as described in Ref. I).

As may be recalled, an identical warbling signal is emitted by Alarm Device 19 when Dictionary Mode is active and a spelling error is detected. To distinguish the two situations when both Dictionary Mode and Word-Alert Mode are active and a commonly-confused word is detected, another control signal is sent to LED 810 via line 844 to cause it to blink intermittently (or shine more brightly, if that type of modulation is desired) if the state of Bit 813 is a ONE (i.e., signal generation is enabled). Signal generation is not actually enabled at this point, however, the situation being rendered somewhat more complex because of the structure of Dictionary List 806. There, several words may share character sequences—e.g. learn, (learn)ed, (learn)ing, and (learn)s. The result is that one must resort to Confusable Word Flag 815 to discriminate between the earlier listed ones of confusable words in a "family" sharing the same character sequences and the last listed one in that "family". Hence, upon detecting a Special Code 807, Program Control 802 does not proceed immediately to check the state of Bit 813 at the address specified in Bytes 808. Instead, Flag 815 is Set to await a determination as to whether a later listed word in the family is actually being entered by the typist, and the codes 808 are saved in a temporary storage register (not shown, but known).

If the next entry at Keyboard 12 is a Word Terminator (space code, period, or the like) the complete word has been entered and Flag 815 being a ONE, Bit 813 in Map 814 is located by first converting character codes 808 into the three-digit Hex code (four binary bits/digit) and then transferring the three least significant bits temporarily to a "Save" byte (again, as is well-known). The Hex digits are then divided by 8 (three rightward shifts, in known fashion) to find the number of bytes between the starting address of Bit Map 814 and the byte containing Bit 813. That quotient is added to the starting address as an offset, the sum defining the address of the byte desired. Thereupon, the value in the "Save" byte is retrieved and set into a down-counter (not shown, but known) and this last counted down bit-by-bit to identify the position of Bit 813 within that last byte (by arriving at ZERO or by detecting a ONE in the known Carry/Borrow Flag of Microprocessor 24). The value stored in Bit 813 is then checked in the manner described earlier and, if ONE, causes issuance of the audiovisual warning—namely, the warbling signal and the intermittent output of LED 810. A search of List 804 for the Group 820 containing the confusable word detected and its definition then follows, as described shortly.

On the other hand, if the next entry at Keyboard 12 is a character, then the word was not completed and scanning of Dictionary List 806 to find the matching character is to continue. Hence, Flag 815 is immediately reset together with the WT Flag 34 previously set to identify an "end of word" tentatively, as described in References I–III. Note that in the latter references, numeral codes 114 serve both as a nodal point—i.e., a point where one or more characters may be added to a matching string of characters to form additional words sharing that string—and also as a possible "End-of-Word" indicator. Detection of a numeral code 114 in Dictionary 806 thus sets not only a numeral code flag (not shown herein), but also the above-mentioned WT Flag 34.

Blinking (enabled by the Set state of Flag 815) is achieved preferably by use of a cyclic counter (not shown, but a known software counter, for example) stepped by the previously mentioned interrupt routine, a step thus occurring every 7 ms. A particular output of the counter (upon reaching ZERO, say, or upon detecting overflow from the last stage of the counter), operates a bistable cell 819 (one bit of memory in Status Register 24D just like a "flag") such that it is triggered ON and OFF at a rate of about 8–10 cycles per second. Cell 819 may control power input to Led 810 (or 812) by supplying a ground level while Cell 819 is a ZERO and a high level while it is in the ONE state, for example. That same modulating signal is directed to LED 812 (by virtue of the Set state of Spelling Error Flag 36), of course, when the previously-mentioned spelling error occurs while in Dictionary Mode so that the typist always knows the reason for emission of the audible warning signal. Thus, the typist can respond with the related sequence of key depressions (302, 20I) to produce a trial correctly-spelled word (as in Ref. III) in case an incorrectly-spelled word is entered in Keyboard 12. Conversely, if the problem is an entry of a confusable word, depression of the identical keys (302, 20I) causes presentation of the particular confusable word (the entered word, identified as above) followed by the related alternative words and their definitions. By successively depressing Index Key 20I, these words and definitions then follow in sequence so that the typist can scan the definitions one at a time to determine which definition most nearly matches the intended one, as stated above. Each alternative and its complete definition are viewable in Display 16 (by scrolling with Spacebar 20S, as necessary, if length of the word and its definition exceeds the capacity of Display 16) until the Index Key 20I is pressed again to bring forth the next alternative and its definition from Word-Alert List 804, as explained below.

Figure 3:
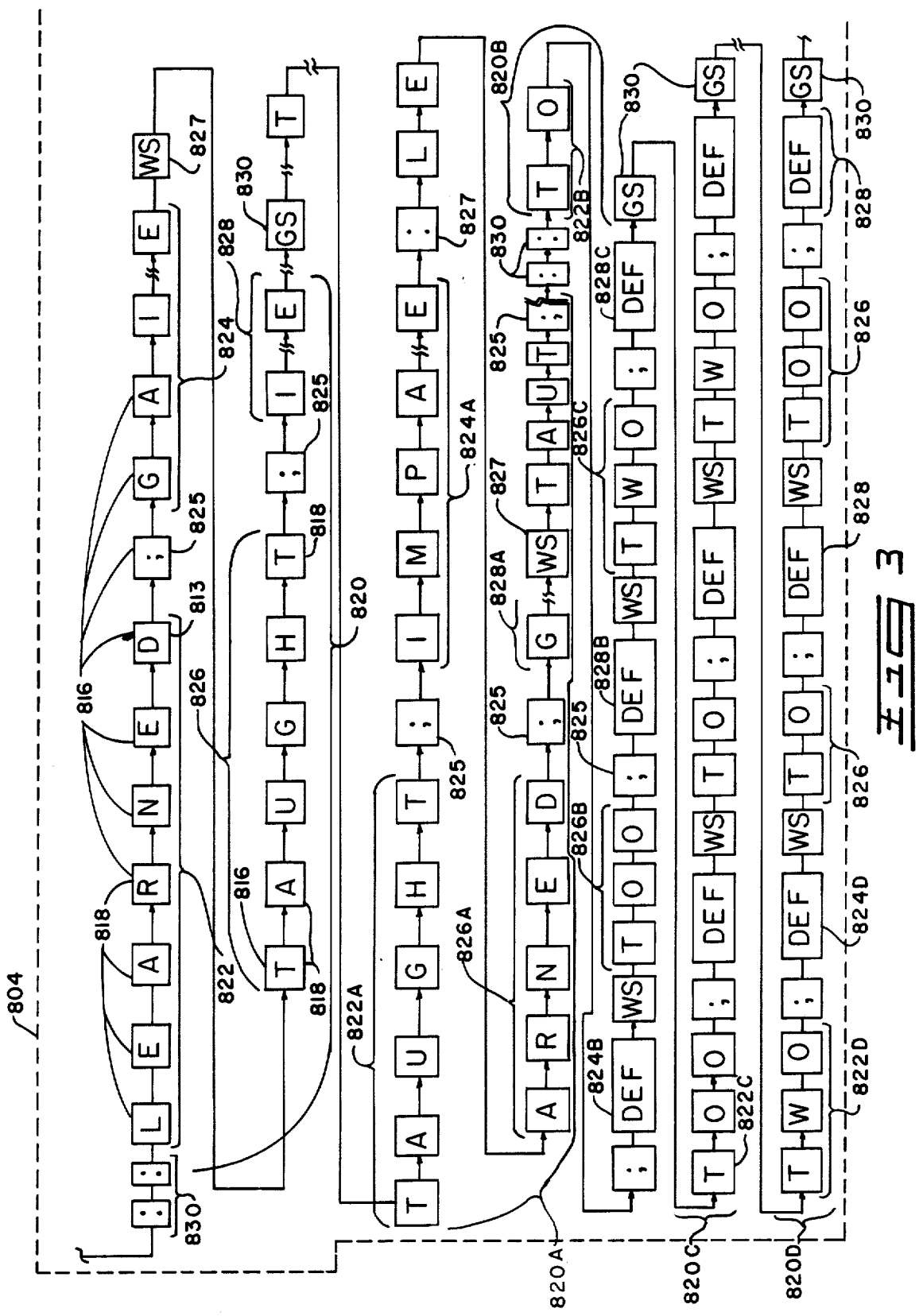
FIG. 3 is a block diagram showing examples of commonly-confused word groups typical of those comprised in the list of FIG. 1.

Consider now the structure of List 804, an exemplary portion of which is shown in FIG. 3. As evident there, the data are stored in a linear arrangement of bytes 816 presenting the characters 818 of confusable words, alternative words and respective definitions in Groups 820. Each such Group 820 consists of a particular confusable word 822 and its definition 824, followed by one or more alternatives 826 of that word 822, together with a definition 828 for each alternative word 826. Words 822, 826 are each separated from their respective definitions 824, 828 by a Definition Separation ("DS") code 825. As evident from the exemplary Word List of FIG. 3, DS code 825 is preferably that for a semicolon. Each Group 820 is separated from the next such Group 820 by discrete coding 830 (preferably by a pair of colons in succession). Groups 820 are arranged in alphabetical order of the successive characters 818 of the particular confusable word 822 (i.e. in dictionary fashion as to the first word of the group). For example, "learned" as a confusable word 822A follows "learn" which is preceded by "leans" (neither shown in FIG. 3), etc.;

whereas "to" as a confusable word 822B precedes "too" (822C), followed by "took" (also not shown) and, several Groups 820 later, by "two" as a confusable word 822D. Note that there is some redundancy because the alternatives in one Group 820 each become the first "confusable" word of another Group 820, all permutations being covered except where an alternative in the one group is not confusable with another alternative in that same group (e.g., "taut" and "learned" are not confusable with each other, the former being confusable only with respect to "taught", as shown in FIG. 3).

Within each Group 820, the alternative words 826 and their definitions 828 are separated from the confusable word 822 (corresponding to that just entered—or located—in the text) by a Word Separator ("WS" hereinafter) code 827. As seen in FIG. 3, WS code 827 is preferably a single colon and also separates successive alternative words 826 and respective definitions 828 from each other. Detection of a semicolon 825 therefore indicates the end of a word, a single colon 827 marks the end of the related definition, and a double colon 830 marks the end of one Group 820 and beginning of the next. Detection of the various separator codes is performed by comparing the particular one sought against each next character in List 804 using the known "CJNE" instruction of Microprocessor 24.

Figure 4:
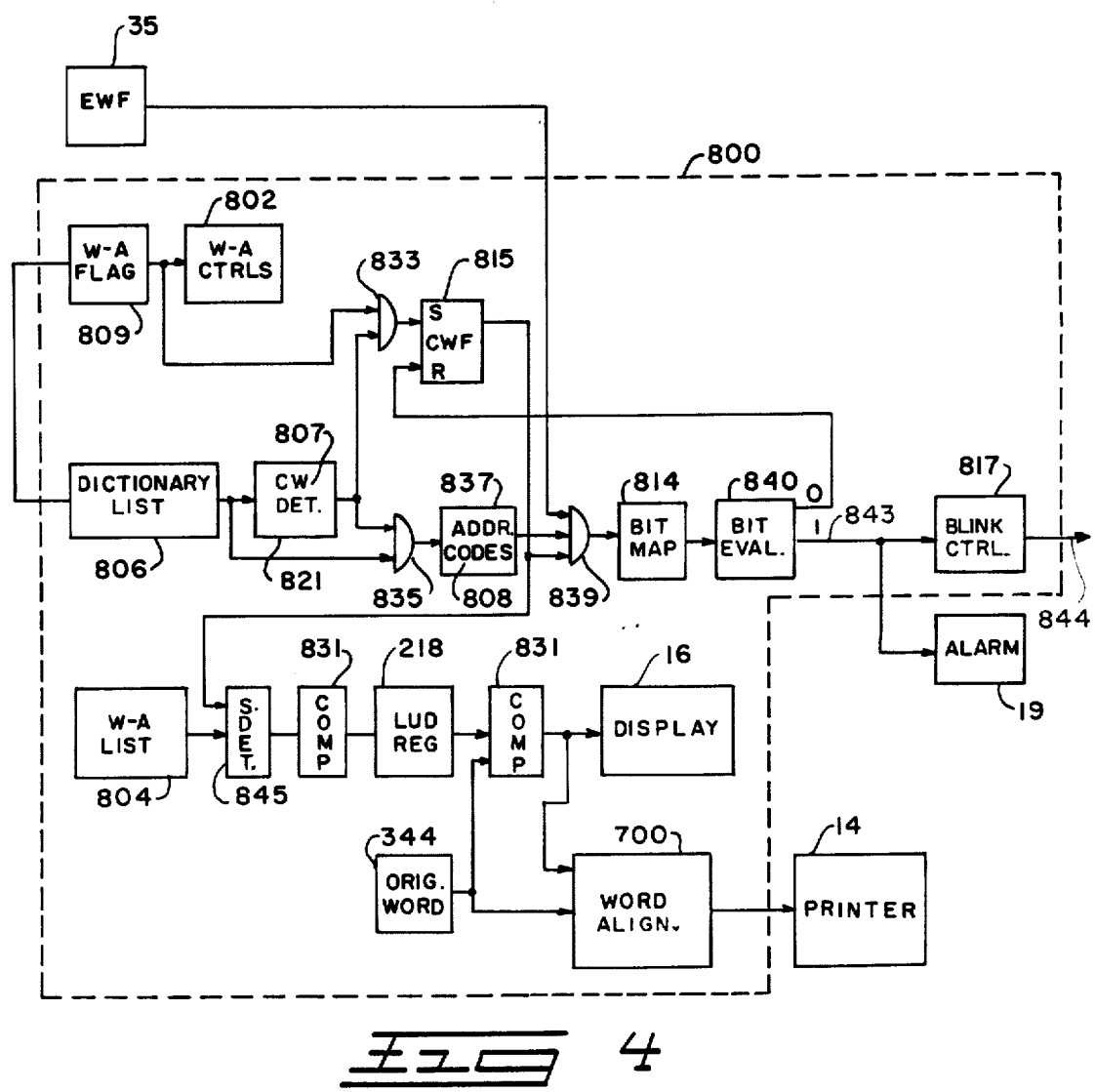
FIG. 4 is a combined block and schematic diagram showing the interaction between the Dictionary List modified to designate entered words which are potentially confusable, an operator controlled Bit Map indicating whether a given word is actually confusable, the control conditions (Flags) for alerting the operator, and the registers respectively storing the original word and the alternative word accepted by the operator by pressing a print control key of the system keyboard in FIG. 1.

Before discussion of operation, a brief review of the invention on the basis of structure and controls depicted in FIG. 4 is believed desirable. There it is seen that Word-Alert requires first that the W-A Flag 809 be Set as indication that Word-Alert Feature 800 has been activated (Code Key 21 and the "A" Key 18A pressed simultaneously). In conjunction (symbolic AND gate 833), a Detector 821 associated with Dictionary List 806 must indicate that the word entered contains "Confusable Word" Code 807 by setting the "Confusable Word" Flag (CWF) 815. At the same time, the positive indication from Detector 821 provides (symbolic AND gate 835) for storing Address Codes 808 (preferably after conversion to Hex code and manipulation into whole byte and frictional byte counts) in a temporary register as shown by block 837. Then, if the next entry at Keyboard 12 is an "End-of-Word" symbol, such that EWF Flag 35 is Set in addition to CWF Flag 815, then the address information of Block 837 is retrieved so as to identify the location of the Enable/Disable Bit 813 and (symbolic AND gate 839) applied to Bit Map 814 to obtain the content of Bit 813. If a ZERO (disable) is present, an output on a line 841 from a Bit Evaluator (Block 840) immediately resets CWF 815. On the other hand, if a ONE is present, an output on a line 843 activates Alarm 19 and Blink Control 817 (related LED's not shown in FIG. 4). Thereafter, the typist's pressing of A-S Key 302 or Index Key 20I with CWF 815 still Set causes a scan of Word-List 804 to locate a matching word at the head of a Group 820 of words and definitions associated with the respective "Confusable Word" 822 (not shown in FIG. 4). The Groups 820 and Alternative Words 826 therein are demarcated by distinct codes (double colons 830 for Groups 820, colons 827 for alternatives within a group, as previously described). Pressing each Key 302 or 20I causes a search for a respective code stored in a "Separator Detector" 845 and compared in known fashion ("CJNE" 831) with successive characters in List 804. Upon finding a match, the characters of the word following are stored in Register 218 and compared with those of the Original Word stored in Register 344. When a further match is found, the word and definition stored in Register 218 are transferred to Display 16 for the typist's scrutiny. Then, depending upon the typist's decision as to the most appropriate definition, A-S Key 302 may be pressed to retain the Original Word or Return Key 20R pressed to select an Alternative Word 826 currently stored in Register 218 (but not necessarily visible in Display 16, if this last has limited capacity and length of the alternative word's definition 828 necessitated scrolling with drop off of Word 826 itself).

If System 10 is in typewriter output mode and the Alternative Word is selected, correction of Document 15A on Printer 14 may require substantial automatic erasure and Word Alignment as indicated by Block 700.

Turning next to operation, Word-Alert 800 may be activated while System 10 is in the typewriter, line or memory output modes previously described. To activate, Code Key 21 is held down and the "A" Key 18A then pressed (graphics appearing on Key 18A preferably show both the "A" symbol and the word "Alert" in finer print). As a result of this simultaneous pressing, W-A Flag 809 is Set, causing LED 810 (located adjacent Display 16 in FIG. 1) to be turned ON in known manner and also causing Device 19 to emit a nonmodulated, audible output (or "beep" as termed herein) to signal that Feature 800 is now active. This output is the one described in Reference I as the usual response of System 10 indicating acceptance of a control command (depression of an alphabetic key 18—or other key, as may be desirable—simultaneously with Code Key 21, as stated earlier).

Once Word-Alert Feature 800 has been activated then, since W-A Flag 809 is Set, whenever any one of the 1606 commonly confused words of List 804 is entered and SC Code 807 (FIG. 2) is read in Dictionary 806 following the last character 811 of the entered word, Word-Alert Control Software 802 takes over. If Flag 809 were not Set, the following Address Codes 808 would be skipped over in known fashion and a pre-scan would then detect either a numeral code 114 denoting the end of a shared word or WT code 112 denoting the end of all words based on the same shared portions, as described in References I-III. Because W-A Flag 809 has been Set in this case, the address codes 808 are not to be skipped, but used to identify the byte and bit locating the corresponding "Alert" Bit 813. The state of that Bit 813 is then determined in the manner previously described (shown as a "Bit Evaluator" block 840 in FIG. 4) and, if a ONE, the Confusable Word Flag 815 remains Set. Upon being interrogated by Master Microprocessor 24 (FIG. 1), that Set state of Flag 815 causes issuance of alarm commands to Slave Microprocessor 60 on Bus Line 58. In turn, via the Output Lines 75a, the Alarm 19 and Blink Controls 817 are energized, the former for a known predetermined period and the latter for so long as CW Flag 815 is set (Flag 815 being reset in known fashion upon detection of a character entry or pressing of A-S Key 302 at Keyboard 12). Note that the call for the typist's attention involves both emitting a modulated ("warbling") signal from Device 19 and also causing Word-Alert LED 810 to blink intermittently as evidence that the problem is an entry of a confusable word 822 rather than a spelling error. If the problem had been the latter, LED 812 associated with Dictionary Mode (assumed also to be ON for purposes of this decription, as stated earlier) would blink intermittently instead. Note that in each case the intermittent blinking stops as soon as entry of the next word begins. An overrun by the typist is thus not only possible, but is even likely with speed typists.

No matter what output mode System 10 is in: whether Typewriter Mode, Line Mode or Memory Mode; the warbling signal is emitted from Device 19 once confusable word 822 has been completed. If the typist has gone past the word by typing several characters or even words from the following text—which is likely with speed typists, as mentioned above—the "Find" control disclosed in Reference V (or a manual backspacing one word at a time, followed by forward spacing over that word) may be used to identify and locate the confusable word 822 (e.g., "learned" in FIGS. 2 and 3. Note that in Line Mode and Memory Mode, forward spacing advances Cursor 832 and does not write a space code over existing characters, but sequentially re-enters these last in the checking routine of Dictionary Program 40b, as seen next. Thus, to locate Confusable Word 822, successive characrters of each word (demarcated at beginning and end by space codes or other punctuation codes) are used to establish a path in Dictionary Data 806 (as though entered through Keyboard 12 in the fashion described in References I and III) to determine presence of a misspelled word or a confusable word, the latter being indicated by detection of Special Code 807, according to the invention, if in Word-Alert Mode (Flag 809 Set). When a word with that Code (807) in it is attained, that circumstance is signalled by again setting Flag 815 (previously reset by the character over-run) to a ONE, such that Word-Alert LED 810 blinks to indicate that the particular word just found has been flagged due to Word-Alert Feature 800 rather than the Dictionary feature (i.e., LED 812 is not blinking) described in Ref. I and improved in Ref. III.

Having found the word flagged by Code 807 (LED 810 blinking), the typist first depresses A-S Key 302 to view that word accompanied by its definition 824 as well as the possible alternatives 826, if necessary. As a result of pressing A-S Key 302, the flagged original word is stored in a Register 344 (704 in Ref. V) and a scan of List 804 is begun, the characters of each first word 822 of a Group 820 (namely, those characters following immediately after a GS Code 830 and before a DS Code 825) are stored in a Working Register 218. Corresponding characters of the two registers (344, 218) are then compared using the known comparator elements (831 in FIG. 4) of Microprocessor 24. Upon any mismatch, a known "CJNE" instruction causes the scan to continue to the next GS Code 830, Register 218 being cleared for receipt of the new characters. Note that each time a GS Code 830 is found, the address corresponding to that start of a Group 820 is stored in a temporary register in known fashion. When all characters of the Confusable Word 822 of a Group 820 and those of an Original Word in Register 344 are found to agree (a blank following the last character in Register 218 and matching a blank in Register 344, detected in fashion similar to, but not identical with, the length disparity detection routine of Reference V, the goals being direct opposites), the matching word 822 and a brief definition 824 of same are transferred from Word List 804 into a Display Buffer 262 and converted into a matrix code using a converter 222 (see Reference II for more details) in order to appear on Display 16 in place of the previous text. In Display 16, definition 824 is separated from the last character of Word 822 by a semicolon (the DS code 825, as mentioned earlier with respect to List 804). If Definition 824 is longer than the capacity of Display 16 (e.g., longer than the 16 character display in some lower cost typewriters), the typist can scroll the content of Display 16 horizontally (a known left shift of Definition 824 across Display 16 with dropout of the leftmost characters in known fashion) by pressing Spacebar 20S until the Control Software 802 stops the scrolling on detecting WS Code 827 (a single colon) denoting the end of Definition 824 (and, of course, start of an Alternative Word 826).

If Definition 824 is not satisfactory, the typist presses Index Key 20I to see the first Alternative Word 826 (and its Definition 828) with which the originally entered word (822) is often confused. In response, Register 218 is cleared and the Alternative Word 826 and its Definition 828 (separated by DS Code 825—a semicolon) are entered therein for purposes of presentation in Display 16. For a complete scan of the accompanying definition 828, it may again be necessary for the typist to scroll across Display 16 by pressing Spacebar 20S, as above described.

If there are additional alternatives 826, another pressing of Index Key 20I brings each further word 826A, etc and its brief definition 828A, etc., into Display 16 via Register 218. When no more alternatives are available, Display 16 preferably shows a message such as "End of List" in known fashion. If the typist has seen all available words without reaching a decision, those presented just previously can be reviewed by merely pressing Reverse Index Key 20RI, successive depressions of which bring the Cursor 832 (an underline as shown in FIG. 2, although other forms are known and are equally suitable) back to the beginning of each alternative word/definition set (defined by the next previous colon) or to the original word of the Group 820, that Original Word 822 being identified by the pair of Colons 830 as Group Separator "GS" preceding it, as may be recalled.

After reading definitions 824, 828; if the typist finds the latter to be more appropriate—i.e., the Original Word 822 was misused—the more appropriate Alternative Word 826 may be selected by pressing Return Key 20R when Cursor 832 is located at any point within that alternative word 826 or anywhere within its definition 828 as presented in Display 16, even when the associated word 826 has been dropped off Display 16 during the above-mentioned scrolling. The misused word 822 is then preferably replaced by word 826 automatically on Document 15A with realignment of the kind disclosed in Reference IV, if such is necessary.

If, on the other hand, the typist does not think the original word 822 was misused after reviewing its definition 824 and that (828) of the alternatives 826, the original word 822 is retained in the text simply by a further depression of A-S Key 302. Display 16 is then cleared of any alternative word 826 and/or its definition 828, the original text being redisplayed thereafter in known fashion. The typist may then again resume typing (preceded by pressing a known "Relocate" Key— not shown—to move to the end of the entered text, if desired). Of course, if the typist decides that there is no need to review the definition 824 of a potentially misused word 822, the alerting signals may be ignored and the foregoing actions dispensed with entirely, Word-Alert Program Feature 800 continuing to check each newly-entered word against Word List 804 as controlled by Bit Map 814.

In Line and Memory Modes, the above-described steps are similarly required except that if Return Key 20R is pressed to select an Alternative Word 826 as replacement for the misused word 822, replacement is simply performed automatically in File Memory 842 and Correction Buffer 54, the misused word 822 being deleted and the selected Alternative Word 826 inserted in its place, and the amended line then presented in Display 16—all in known fashion (see, for example, the description in Reference II).

In Memory Mode, Word-Alert 800 may also be activated when the position of Cursor 832 is either at the beginning or at the end of text which has been entered and stored, previous entry of commonly-confused words 822 having produced a warbling signal from Device 19 and a blinking of LED 810 to mark particular words as commonly-confused ones, but the typist having ignored these signals at the time. Simultaneous pressing of Code Key 21 plus the Character Key 18F causes initiation of the above-mentioned "Find" operation. The resultant forward (or backward) scan of text in File Memory 842 will then stop successively at each word (defined by word terminator codes—periods, commas, etc—before and after a string of characters) entered previously through Keyboard 12. Each such word is sensed once again by entry of successive characters through the paths defined by Dictionary Tables 78, 80, 82 and 84, in the same manner as described previously. Encountering a mis-spelled word or commonly-confused word is signalled by flashing of the respective LED 812 or 810.

As mentioned earlier, usage of particular words in List 804 may never be confused by a given typist. In that case, the system's audiovisual alerting of entry of these words would be an unnecessary distraction. Hence, a typist normally prefers to inhibit detection of entry of these particular words such that their entry will not be accompanied by the audiovisual alerting signals thereafter. This may be achieved, for instance, by pressing Code Key 21 together with a known "Word Eraser" Key 834 when Print Hammer 23 (Type Mode) or Cursor 832 (Line or Memory Mode) is located at each word identified, as explained, by blinking of Word-Alert LED 810. Word-Eraser Key 834 ordinarily deletes all characters between space codes (or punctuation codes) of a word pointed to by Cursor 832 but, in response to a "Set" state of Confusable Word Flag 815, here causes Bit 813 at the address (offset) designated by the Codes 808 to be reset to a ZERO—i.e., inhibiting the audiovisual signalling of entry of that particular word thereafter—as previously stated.

As an example, assume that a typist never confuses use of the word "to" 822B (see FIG. 3) with "too" 826 B or "two" 826C. Accordingly, that typist therefore enters the word "to" through Keyboard 12 with Word-Alert activated (LED 810 turned ON). The warbling signal is heard from Device 19 and Word-Alert LED 810 blinks, both as described before. The typist then presses A-S Key 302, causing the word "to" 822B and its definition 824B to appear on Display 16. Next, the typist jointly presses Code Key 21 and Word Eraser Key 834 in response to which the corresponding Bit 813 in Map 814 (FIG. 1) is set to a ZERO, thus disabling any further warning in response to entry of that word, as stated previously. To this end, as described before, the stored Address Codes 808 of Bit 813 (previously converted to three Hex codes, and right-shifted three times after saving the three leastsignificant bits) are retrieved, the whole bytes added as an offset to the starting address of Bit Map 814, the three fractional bits retrieved in turn and then counted down to attain the location of Bit 813 where a ZERO is written to complete the task.

If the typist also wants to turn off the related words "too" 826C and "two" 826D, it may be done at the same time by pressing Index Key 20I to cause successive display of each of these Alternative Words 826C, 826D. Again, upon jointly pressing Code Key 21 and Word Eraser Key 834 while the respective word 826C or 826D (or any part of a corresponding definition 828C—or 828D—no matter whether 828C or 828D has been scrolled relative to Cursor 832 such that no part of word 826C or 826D is visible, as before) is being displayed, the corresponding Bit 813 for each of these words is likewise set to ZERO in the fashion just described. An exception is appropriate clearance of the temporary register holding the Address Codes 808 of the Confusable Word 822. Development and storage of the comparable information for Alternative Word 826 is accomplished by re-entering the characters of the latter via the checking of Dictionary Program 40b (Reference I). The remainder of the selective inhibiting operation is identical to the foregoing. If this additional inhibiting action is not pursued, the latter words will continue to be checked by Word Alert Feature 800 and their entry (or presence in the text) signalled just as before, even though entry of the original word "to" 828B will be ignored.

If a different typist wishes to use System 10 (i.e. the typewriter), but needs checking of all 1606 confusable words, Word Alert feature 800 can be set to its initial condition (a ONE in each location of Bit Map 814) by holding down Key 18A while turning on Power Supply 13 to energize System 10 (by operation of a known ON/OFF switch, not shown here). Turning Power Supply 13 ON activates a known initializing routine which includes setting each bit in Map 814 to a ONE (in a well-known manner), provided Key 18A is held down during the initializing routine as a controlling condition. Of course, if Code Key 21 is held down and Key 18A pressed simultaneously at any time thereafter, Word-Alert 800 is activated again. Accordingly, LED 810 is turned ON and an audible signal emanates from Device 19. Thereafter, upon entry of any Consufable Word 822 from List 804, blinking of LED 810 (an intermittent variation in brightness) ensues, as described previously.

We claim:

1. A word-processing system having a memory, character and control input to the system through a keyboard with a set of alpha-numeric and function keys depressible by an operator, and a display normally presenting text currently entered by the operator; in combination with:

a list of commonly-confused words stored within said memory, each word of a commonly-confused group in said list being followed by the definition thereof and at least one alternative word confusable therewith, said at least one alternative word being followed, in turn, by a discrete definition corresponding thereto;

a detection element for sensing any word from said list of commonly-confused words entered into the system, a generator of a warning signal for the operator normally activated in response to said detection element sensing an entered word from said list;

a first control responsive to pressing a given key of said set, said first control replacing said text in the display by the entered word from the list along with the definition thereof;

a second control responsive to pressing a further key of said set subsequent to pressing said given key, said second control presenting in the display said alternative word and said discrete definition in place of the entered word and the definition thereof;

a plurality of conditioning means interposed between the detection element and the generator, each of said plurality corresponding to a particular word in the list, including the entered word and the at least one alternative word confusable therewith, and each of said plurality being initially in a first state enabling activation of said generator by said detection element; and a third control operative to change the conditioning means corresponding to the entered word to a second state in response to pressing an other key of the set subsequent to pressing said given key, said second state disabling responsiveness of said generator to sensing of said entered word thereafter; and operative to change the conditioning means corresponding to the at least one alternative word into said second state independently in response to pressing said other key subsequent to pressing said further key for presenting said at least one alternative word and corresponding discrete definition in the display for consideration by the operator, said second state disabling responsiveness of said generator to sensing of the at least one alternative word thereafter, whereby alerting an operator as to entry thereafter of any word in a group of commonly-confused words may be selectively and independently disabled upon first detecting one of the group in said text.

2. The word processing system of claim 1, wherein pressing of said further key has caused said at least one alternative word and discrete definition to be displayed, and further including program controls for inserting and removing data from text presented in said display, and a fourth control responsive to the operator's pressing of yet another one of said depressible keys when said discrete definition corresponding to the at least one alternative word, displayed in response to pressing the further key, more nearly matches the desired definition, said fourth control being operable to replace said entered word in said text by the at least one alternative word.

3. The word-processing system of claim 2, wherein said display includes a cursor movable relative to characters therein and has a capacity less in number than the totality of characters in said alternative word and the definition thereof, such that a terminal portion of said totality of characters is displayable only by exclusion of said alternative word from said display upon scrolling of said terminal portion relative to said cursor to bring about display of said terminal portion; and means operating said third control independently of said exclusion of the at least one alternative word from the display.

4. The word-processing system of claim 3, wherein said means operating said third control comprises a register storing an address relating to said alternative word.

5. The word processing system of claim 1, wherein said detection element comprises a second list of properly-spelled words together with marker means therein, said marker means identifying discrete words of said second list as being duplicates of words in said list of commonly-confused words; and individual memory means comprising said conditioning means and being present in one-to-one correspondence with said discrete words, each said individual memory means normally being in said first state enabling generation of said warning signal and wherein said third control comprises address means associated with each of said discrete words of the second list, said address means locating the individual memory means for selective setting by said operator to said second state disabling generation of said warning signal.

6. The word processing system of claim 7, wherein said keyboard includes a particular depressible key operable to return all said individual memory means to said first state.

7. The word processing system of claim 6, wherein said particular depressible key is a given alphanumeric key, said system includes an initializing program effective upon applying power to said system, and said return to said first state is responsive to applying of said power while simultaneously depressing the given alphanumeric key.

8. The word processing system of claim 5, wherein said second list comprises a spelling dictionary and said marker means is a discrete code following the last character of each word in said spelling dictionary duplicating a word in said list of commonly-confused words.

9. The word processing system of claim 5, wherein said individual memory means is a plurality of binary cells corresponding in number to the quantity of commonly-confused words.

10. The word processing system of claim 9, wherein said binary cells are arranged in a given linear sequence, said second list comprises a spelling dictionary and said marker means is a particular code following the last character of each word in said spelling dictionary duplicating a word in said list of commonly-confused words, and said address means comprise at least one numeral code following said particular code, said at least one numeral code identifying the sequential position of the cell corresponding to said duplicating word in said spelling dictionary.

11. The word processing system of claim 5, wherein said word list is accompanied by a spelling dictionary, the warning signal from said generator is also operative as an error indicator activated upon entry of an improperly spelled, plural character word; and further including means operable to produce a first trial word from said dictionary based on characters in said improperly spelled word, said trial word producing means being responsive to pressing of said given key subsequent to activation of said warning signal as error indicator, and discriminating means distinctively modifying said warning signal in respective response to said entry of an improperly spelled word and to said entered word from said list of commonly-confused words.

12. The word-processing system of claim 11, wherein said warning signal generator is an audiovisual device and said discriminating means comprises individual sources of intermittent light respectively activated on said entry of an improperly spelled word and on said sensing of an entered word from said list of commonly-confused words.

* * * * *